United States Patent [19]

Berney

[11] 4,351,039

[45] Sep. 21, 1982

[54] TIMEPIECE WITH A DETECTOR AND CONTROL CIRCUIT FOR A STEPPING MOTOR

[75] Inventor: Jean-Claude Berney, Chemin du Bois de Menton, 1066 Epalinges, Switzerland

[73] Assignee: Jean-Claude Berney, Epalinges, Switzerland

[21] Appl. No.: 184,870

[22] Filed: Sep. 8, 1980

[30] Foreign Application Priority Data

Sep. 10, 1979 [CH] Switzerland .......................... 137/79

[51] Int. Cl.$^3$ ....................... G04B 19/00; C04C 19/00

[52] U.S. Cl. ....................................... 368/76; 368/86; 368/160; 318/696

[58] Field of Search ................ 368/66, 76, 80, 85–87, 368/155, 156, 159, 160; 318/696

[56] References Cited

U.S. PATENT DOCUMENTS 4,192,131 3/1980 Hosokawa et al. ................ 368/157
4,212,156 7/1980 Kawamura et al. ................. 368/85
4,216,648 8/1980 Maire .................................. 368/66
4,300,223 11/1981 Maire .................................. 368/85

FOREIGN PATENT DOCUMENTS 2854084 of 0000 Fed. Rep. of Germany ...... 368/185
2413663 of 0000 France ............................... 368/185
2200675 4/1974 France ................................ 368/85
2410843 11/1978 France ................................ 368/85

*Primary Examiner*—Vit W. Miska
*Attorney, Agent, or Firm*—Wender Murase & White

[57] ABSTRACT

The timepiece comprises a detector and control circuit for the stepping motor. This circuit comprises on the one hand an amplifier including at least a MOS transistor receiving on a first terminal a voltage representative of the current in the driving coil of the motor and having a second terminal joined up to a condenser connected to one of the poles of a power source. The amplifier delivers signals representative of the current in the condenser. The circuit comprises on the other hand means connected to the amplifier for controlling the driving pulses. The circuit is easy to integrate and it has a very low power consumption.

14 Claims, 7 Drawing Figures

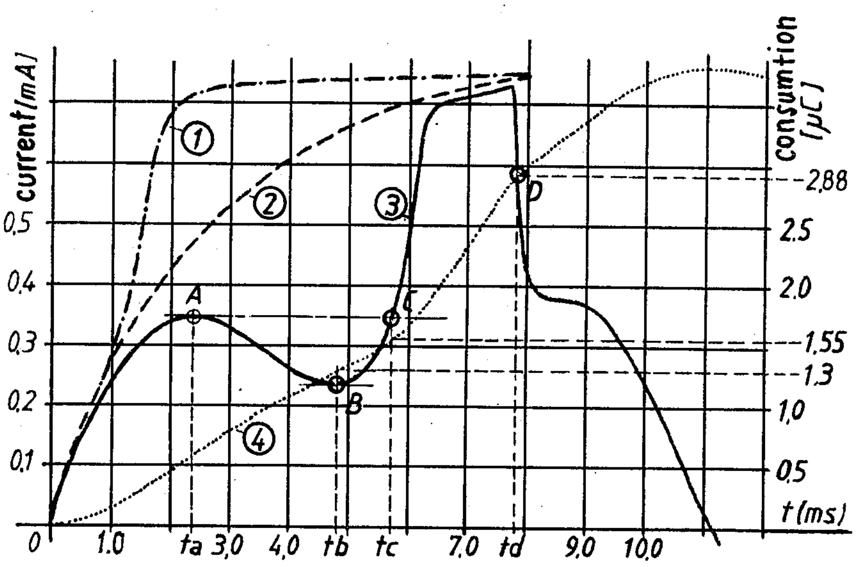
FIG. 1
FIG. 5
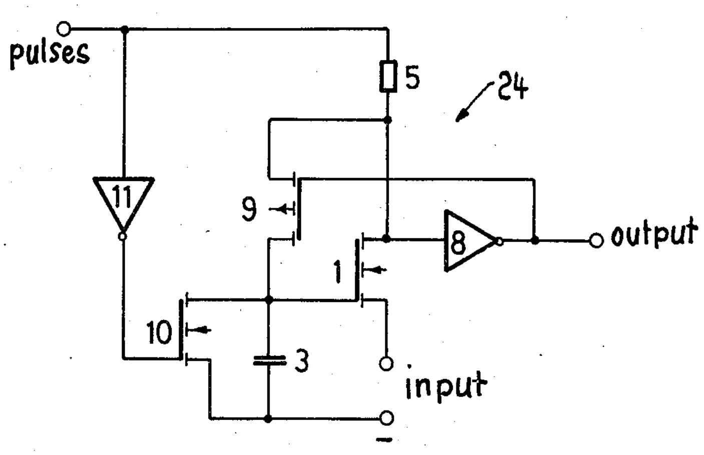

TIMEPIECE WITH A DETECTOR AND CONTROL CIRCUIT FOR A STEPPING MOTOR

BACKGROUND OF THE INVENTION

It is well known that the analog quartz crystal watches utilize mostly a stepping motor for driving the hands of the watch. The stepping motor is generally fed by pulses of fixed duration, whereby the duration of the pulses is determined to insure a good operation of the motor in the worst case with respect of the supply voltage and the torque. As a result, the motor is in most cases overdriven. This shows that it could be possible to appreciably decrease the current consumption if one adapts the driving pulses to the real needs of the motor. This is more particularly important for the battery operated timepieces. To this end, it is necessary to utilize a detector circuit of the real passing of the rotor from one stable position to the next stable position. The signal delivered by the detector circuit usually determines through a servo system the optimum duration of the driving pulses.

Known systems utilize a contact rigidly locked with the gear-train of the watch. Other known systems utilize all electronic detector devices. All of these known systems analyze either the form or the amplitude of the current in the motor coil, either during the driving pulse or a short time later. The principal encountered difficulty is to realize a configuration of the circuit easy to integrate, having a low current consumption and no critical components.

It is therefore an object of the present invention to realize a timepiece with a detector circuit showing the above mentioned advantages and capable to be utilized in a control system of the number or of the duration of the driving pulses.

SUMMARY OF THE INVENTION

According to the present invention, there is provided a timepiece comprising a frequency divider, a former of driving pulses, a stepping motor, detector means of the current of said motor and a power source, said timepiece further comprising on the one hand an amplifier including at least a MOS transistor receiving on a first terminal a voltage representative of the current in the driving coil of said motor, a second terminal of said transistor being joined up to a condenser connected to one of the poles of said power source, means for charging said condenser, and means for discharging said condenser, said amplifier delivering signals representative of the current in said condenser and, on the other hand means for controlling the driving pulses, said driving pulses controlling means being connected to said amplifier and to said former of driving pulses.

BRIEF DESCRIPTION OF THE DRAWINGS

The invention will be described further by way of example with reference to the accompanying drawings in which:

FIG. 1 shows characteristic waveforms of the current of a motor for a timepiece, FIG. 5 is a diagram of a third amplifier for the electronic circuit of a timepiece according to the invention.

DESCRIPTION OF THE PREFERRED EMBODIMENT

Figure 2:
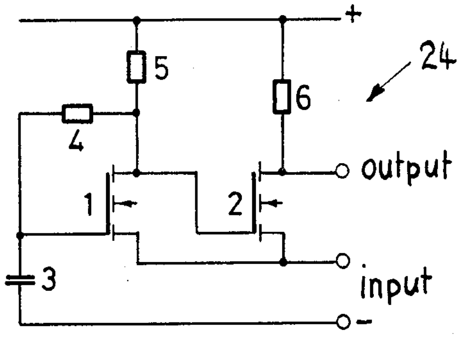
FIG. 2 is a diagram of a first amplifier for the electronic circuit of a timepiece according to the invention.

FIG. 1 shows the characteristic waveforms of the current of a stepping motor of the Lavat type. Such a motor has two stable positions and it requires bipolar driving pulses. When the rotor is not in the starting position corresponding to the polarity of the driving pulse the current in the motor is represented by the waveform 1. If the rotor is blocked but in the position corresponding to the polarity of the driving pulse, the current is represented by the waveform 2. If the rotor is free and in the position corresponding to the polarity of the driving pulse, the current follows the waveform 3. The curve 4 is the integral of curve 3 and it permits to know the consumption of the motor as a function of the duration of the driving pulse.

In the cases corresponding to the waveforms 1 and 2, the rotor does not rotate and the current increases regularly during the driving pulse. The current reaches a maximum the value of which is determined by the ratio of the amplitude of the voltage of the driving pulse across the driving coil to the resistance of the coil. In case 3, however, the rotor rotates and it induces a back electromotive voltage which has a tendency to reduce the current. Consequently, the latter decreases after a certain time ta and increases again later, at time tb. It reaches and exceeds at time tc its value corresponding to the time ta, after what it increases further toward its maximum value.

The waveform 3 shows three characteristic points A, B and C which are non existing on the waveforms 1 and 2. The detection of the presence or of the absence of one of these points makes it possible to detect lost or non effected steps by the rotor. The detection of one or the other of these points permits also to control the duration of the driving pulses. As an example, it is known in practice that the driving pulse may be interrupted at point B without affecting the correct operation of the motor. The current consumption decreases then from 2.88 $\mu$C for a standard pulse of 8 ms duration to 1.3 $\mu$C. The current consumption is therefore reduced of more than 50%. By interrupting the driving pulse at point C, the current consumption decreases to 1.55 $\mu$C which is also interesting.

FIG. 2 shows an amplifier circuit for detecting the points A and B. The amplifier comprises two N-MOS transistors 1 and 2 the sources of which are connected together and to the input terminal of the amplifier. The gate of transistor 1 is connected to a condenser 3 which in its turn is connected to the negative pole of the supply and to a resistor 4 of very high value connected to the drain of transistor 1. This drain is connected to the positive pole of the supply through a resistor 5 and to the gate of transistor 2. The drain of transistor 2 is connected to the positive pole of the supply through a resistor 6 and to an output terminal of the amplifier. The transistors 1 and 2 as well as the resistors 5 and 6 are paired in such a manner that the two stages of the amplifier have the same characteristics. The voltage applied to the input of the amplifier is proportional to the current in the driving coil of the motor and it presents the same waveform as this current. The amplitude of the input voltage is of some tens of millivolts. The amplifier operates as follows. When the input voltage is not variable, the voltages on the gate and the drain of transistor 1 are equal, as well as the output voltage. There is no current in the resistor 4 and the voltage across the condenser 3 is stable.

If the input voltage increases, the gate-source voltage of transistor 1 decreases which produces a decrease of the current in this transistor and in the resistor 5. The voltage on the drain of transistor 1 increases and the output of the amplifier passes to 0. At the same time a current flows through the resistor 4 and charges the condenser 3 with a tendency to restore the previous state of equilibrium.

If the input voltage decreases, the gate-source voltage of transistor 1 increases which produces an increase of the current in this transistor and in the resistor 5. The voltage on the drain of transistor 1 decreases and the output of the amplifier passes to 1. At the same time a current flows through the resistor 4 and discharge the condenser 3.

If the input voltage ceases to increase or to decrease and stabilizes itself at a new value, the voltage across the resistor 4 tends to zero and the amplifier is in the state corresponding to the first case described above.

It is to be seen that the output voltage of the amplifier is independent on the amplitude of the input voltage but that it represents, save on the sign, the polarity of the current in the resistor 4 and the condenser 3. Any increase of the input voltage produces a 0 and any decrease of the input voltage produces a 1 at the output of the amplifier.

Figure 4:
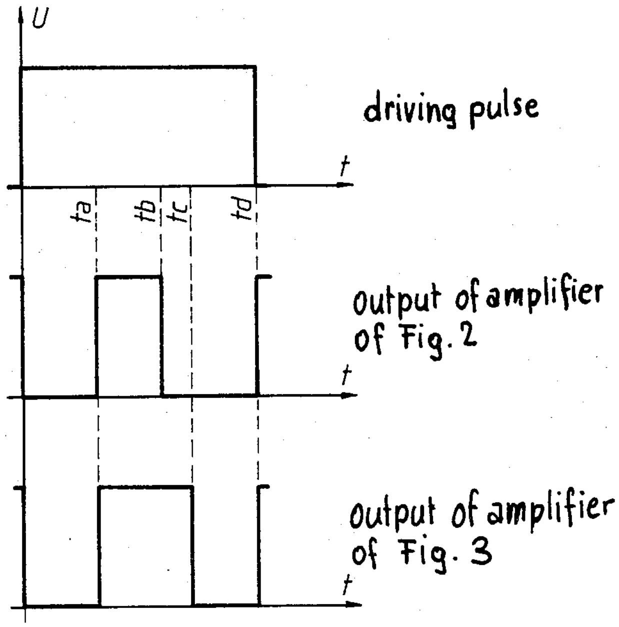
FIG. 4 shows the output signals of the amplifiers of FIGS. 2, 3 and 5.

If we consider the output voltage illustrated in FIG. 4, it is to be seen that the output of the amplifier is at 0 between t=0 and t=ta, passes to 1 between t=ta and t=tb and returns to 0 between t=tb and t=td.

It is also to be recognized that the amplifier circuit of FIG. 2 is easy to integrate. The resistors 4, 5 and 6 may be replaced by current sources in MOS technology or by oxyde layers. The condenser 3 being connected to a pole of the supply, may be realized by means of a substrate capacitor. It is known that such a substrate capacitor may have values of many tens of pF. It is further to be seen that if the current corresponds to one of the characteristics 1 or 2 of FIG. 1, the condenser 3 charges permanently so that the output of the amplifier remains at 0 during all of the driving pulse. This feature permits to detect lost or non effected steps.

Figure 3:
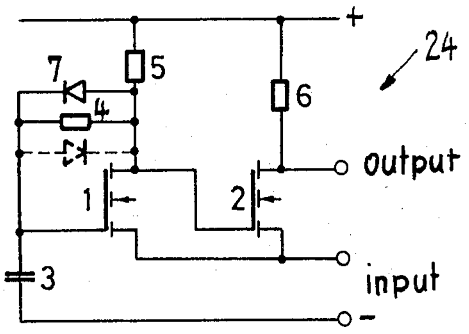
FIG. 3 is a diagram of a second amplifier for the electronic circuit of a timepiece according to the invention.

FIG. 3 shows an amplifier circuit for detecting the points A and C of the waveform 3 of FIG. 1. It is easier to detect the point C than the point B because, in practice, it is sometime difficult to measure with enough accuracy the point B for the reason that the parasitic vibrations of the rotor produce a parasitic induced voltage and a ripple of the motor current. On the other hand, the point C is situated within a region where the slope is already high and it may be, in any case, precisely measured.

The amplifier of FIG. 3 is practically the same as the one of FIG. 2 and it comprises the N-MOS-type transistors 1 and 2, the condenser 3 and the resistors 4, 5 and 6. A diode 7 is connected in parallel with the resistor 4 which has a very high value for practically avoiding any discharging of the condenser 3 during the duration of the driving pulse (duration shorter than 10 millisecond). However, the discharge of the condenser 3 through the resistor 4 has enough time to occur between two successive driving pulses (duration 1 second). The diode 7 permits only the charging of the condenser 3 but not its discharging. During the driving pulse, when the input voltage increases, the output voltage is at 0 and the condenser charges. On the other hand, when the input voltage decreases, the output voltage changes to 1 but the condenser 3 cannot significantly discharge so that it keeps its previous acquired voltage and it is necessary that the input voltage reaches again and exceeds the former level for the output of the amplifier to return to 0. Thus, considering once again FIG. 1, it is to be seen that the output comes back to 0 at the instant where the current reaches and exceeds the level of point A. This occurs in point C. The output waveform of the amplifier is illustrated in FIG. 4.

If the resistor 4 is replaced by a diode (indicated in dotted line in FIG. 4) connected backward with respect to diode 7, the amplifier becomes again symmetrical. The condenser may again discharge and the output signal is the same as the one of the amplifier of FIG. 2. However, the new configuration is less sensitive to disturbances than the amplifier of FIG. 2.

It is to be seen that in the amplifier of FIG. 3, the means for charging the condenser are different and distinct from the means for discharging it. It is this feature which makes it possible to detect the point C of the waveform 3 of FIG. 1.

It is to understand that in order to facilitate the explanation, the amplifiers of FIGS. 2 and 3 are extremely simplified. For instance, in order to reduce the power consumption to a minimum, it is very desirable to let the amplifier operate for the strictly required period of time only. On the other hand it is advisable to replace the diodes by MOS transistors which are easier to integrate. An amplifier having these characteristics and comprising distinct means for charging and discharging the condenser is illustrated in FIG. 5, by way of example. However, it is clear that many other configurations are possible. The amplifier of FIG. 5 permits the detection of the points A and C of FIG. 1.

The amplifier comprises the transistor 1, the condenser 3 and the resistor 5 which may be a current source in MOS technology. The drain of the transistor 1 is connected to the input of an amplifier-inverter 8 comprising two complementary MOS transistors. The output of the inverter 8 is connected to the gate of the P-MOS transistor 9 the source of which is connected to the drain of transistor 1 and the drain of transistor 9 to the gate of transistor 1 and to the condenser 3 as well as to the drain of the N-MOS transistor 10. The source of transistor 10 is connected to the negative pole of the supply and its gate to the output of an inverter 11 comprising two complementary type MOS transistors. The input of the inverter 11 is connected to the resistor 5 and it receives a positive voltage during the driving pulse. Between the driving pulses, the input of the inverter 11 is at 0 and its output at 1. The transistor 10 is conducting so that the condenser 3 is short-circuited. The potential on the gate of the transistor 1 is at 0 and this transistor is non conducting. The input of the inverter 11 is at 0 and this potential is delivered to the drain of transistor 1 by the resistor 5. The output of the inverter 8 is at 1, the transistor 9 is non conducting and the current consumption of the amplifier is practically zero.

At the instant of a driving pulse the input of the inverter 11 changes to 1 as well as the drain of transistor 1. The output of the inverter 8 passes to 0 and the transistor 9 becomes conducting. At the same time, the output of the inverter 11 is at 0 and the transistor 10 becomes non conducting. It is to be seen that in the described amplifier, the means (transistor 9) for charging the condenser and the means (transistor 10) for discharging it are distinct and that they may be switched so as to be set in turn out of action. When the transistor 9 is conducting the condenser 3 charges through the resistor 5. However, the potential on this resistor (drain of transistor 1) remains sufficiently high so that the output of the inverter 8 remains at 0 and that the transistor 9 remains conducting as long as the input voltage increases, that is to say until the point A of FIG. 1. When the input voltage decreases, the current in the transistor 1 increases, the potential at the input of the inverter 8 decreases and the output of the inverter 8 changes to 1 which blocks the transistor 9. The condenser 3 cannot be charged nor discharged so that it maintains on the gate of the transistor 1 a voltage corresponding to the input voltage at point A of FIG. 1. It will be necessary to wait until the input voltage (at point C) exceeds the voltage at point A for the transistor 9 to become again conducting, charging again the condenser 3. After the end of the driving pulse the amplifier is set again out of action which means that the output of the inverter 11 changes to 1 with the consequence that the transistor 10 becomes conducting and discharges the condenser 3.

For the type of motor having the characteristics given in FIG. 1, the point A occurs between the second and the fourth millisecond from the beginning of the driving pulse. If there is no corresponding signal (positive going edge) at the output of the amplifier during this interval of time, this means that the motor is in the case 2 (rotor blocked) or, more probably, in the case 1 (rotor 180° out of phase) which indicates that the preceding step has mostly not been effected. It is then possible to achieve a correction for the two lost steps which consist for this type of motor in delivering to the motor two additional driving pulses at opposite polarity for making up for the preceding lost step and for the step to be effected. The presence of a negative going edge appearing after the positive going edge corresponding to the point A of FIG. 1 in the output signal of the amplifier indicates that the current of the motor has reached a value corresponding either to the point B or to the point C of the waveform 3 of FIG. 1, according to the type of amplifier utilized. This negative going edge may then be utilized for abridging the duration of the driving pulse of the motor.

Figure 6:
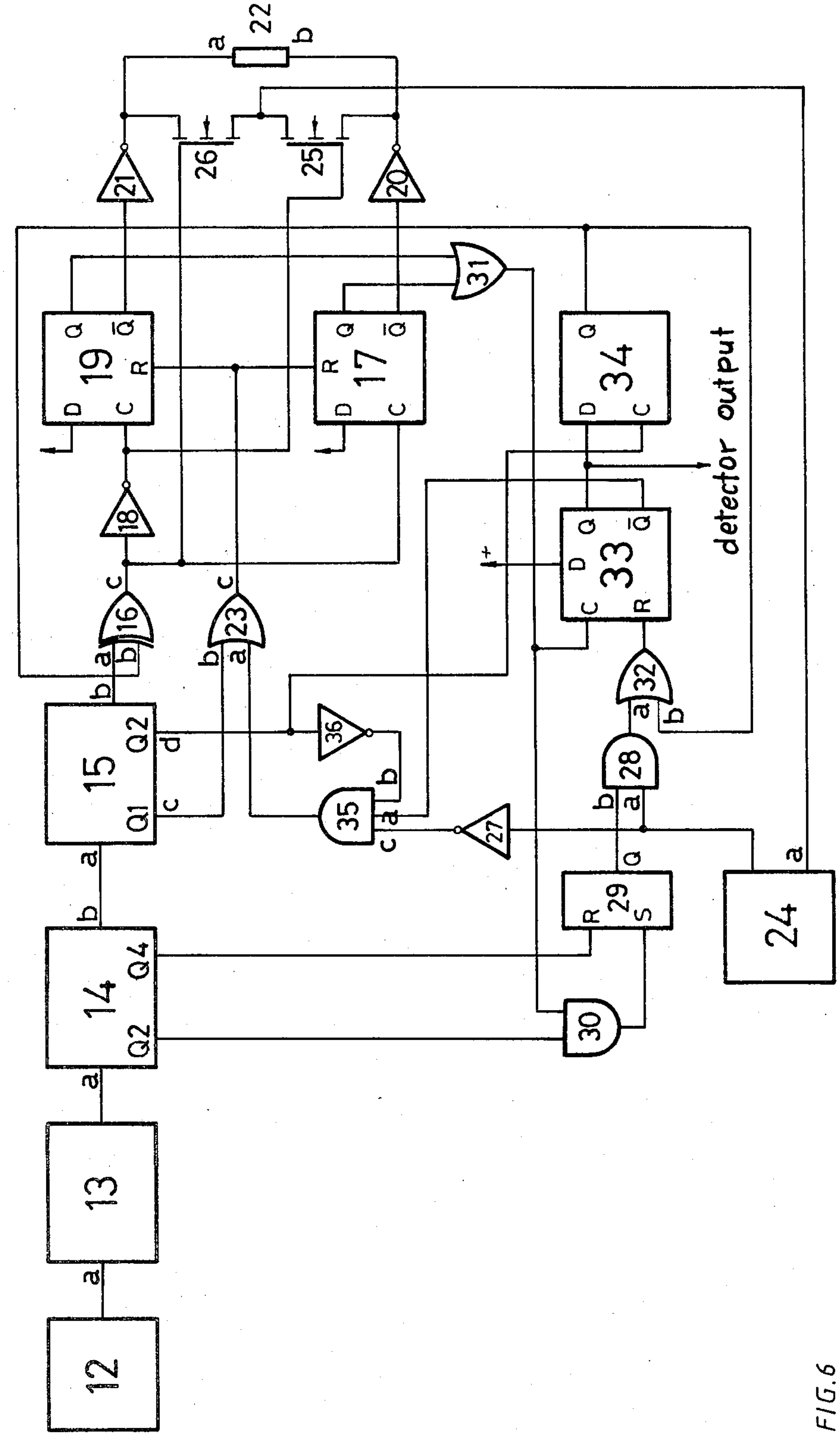
FIG. 6 shows a block diagram of a circuit for a timepiece according to the invention in which the amplifier is associated to means for abridging the duration of the driving pulses and for detecting and making up for lost steps.

The circuit shown in FIG. 6 permits to effect the various functions indicated above. In order to facilitate the understanding of the operation of the circuit it is admitted that the frequency dividers and the counters are activated by the negative going edge of their clock pulse and that the D-type as well as the RS-(NOR gate) type flip-flops are activated by the positive going edge of their clock pulse.

The output of the oscillator 12 (having e.g. a frequency of 32768 Hz) is connected to the input a of a frequency divider 13 comprising 5 binary stages and delivering to the input a of a counter by 8 of Johson-type 14 a signal having a frequency of 1 kHz. The output b of the counter 14 is connected to the input a of a frequency divider 15 comprising 8 binary stages and delivering at its output b a square pulse having a frequency of 0.5 Hz. The output b of the divider 15 is connected to the input a of an EXCLUSIVE-OR gate 16 the output c of which is on the one hand connected to the clock input C of a D-type flip-flop FF 17 and, on the other hand through an inverter 18 to the clock input C of a D-type flip-flop FF 19. The FF 17 and FF 19 the D inputs of which are connected to the positive pole of the supply (logic state 1) are activated in turn each second and deliver the even and odd pulses of opposite polarity required for the driving of the motor. To this end the inverted outputs Q of FF 17 and FF 19 are connected respectively to the power inverters 20 and 21 the outputs of which are respectively connected to the terminals b and a of the driving coil 22 of the stepping motor.

The reset inputs R of the FF 17 and FF 19 are connected to the output c of an OR gate 23. The reset signal applied to these inputs R permits to terminate the duration of the driving pulses. The input b of the gate 23 is connected to the output c (Q1) of the divider 15 which delivers a square pulse of a frequency of 64 Hz. This signal is at 0 at the moment where the FF 17 and FF 19 change over to 1 and it changes to the state 1 after 8 ms. The maximum duration of the driving pulse is thus 8 ms, but it may be shortened by the signal delivered to the input a of gate 23. The input a of the detector-amplifier 24 which may be one of the amplifiers already described above with respect of the FIGS. 2, 3 or 5, is connected to an electronic switch comprising the transistors 25 and 26 so that this input a of the amplifier 24 is alternately switched to each one of the terminals a and b of the driving coil 22, the transistors 25 and 26 being connected in such a way as to select the terminal which is at the state 0 during the driving pulse. It is known that the power amplifiers manufactured in complementary MOS technology are not perfect because they exhibit a certain internal resistance. In consequence, the driving current which flows in these amplifiers produces at their outputs a proportional voltage drop. Hence, the slope of the waveform of this voltage drop is the one illustrated in FIG. 1 (waveforms 1, 2 or 3). The amplitude of this voltage drop is in the order of a few tens of millivolts which is sufficient for driving the amplifier 24. The output of the amplifier 24 is connected to the input of an inverter 27 and to the input a of an AND gate 28 the input b of which is connected to the direct output Q of a RS-type flip-flop FF 29. The reset input R of FF 29 is connected to the output Q4 of the Johnson-type counter 14 and the set input S of the same FF 29 is connected to the output of an AND gate 30. The inputs of gate 30 are connected respectively to the output Q2 of the counter 14 and to the output of an OR gate 31 the inputs of which are connected to the direct outputs Q of FF 17 and FF 19.

During the driving pulse, whichever even or odd, the output of gate 31 is at 1. At the second millisecond after the beginning of the driving pulse the output Q2 of the counter 14 changes to 1 as well as the input S of FF 29 which also passes to 1. At the fourth millisecond of the driving pulse the output Q4 of the counter 14 changes to 1 and resets the FF 29. The input b of the AND gate 28 is therefore at 1 between the second and the fourth millisecond of the driving pulse. We have seen above that it is during this interval of time that the point a of the waveform 3 of FIG. 1 should normally appear, which produces a positive going edge at the output of the amplifier 24. If this occurs the output of gate 28 changes to 1.

The output of gate 28 is connected to the input a of an OR gate 32 the output of which is connected to the reset input R of a D-type flip-flop FF 33. The clock input C of FF 33 is connected to the output of gate 31, its direct output Q to the input D of a D-type flip-flop FF 34, its inverted output Q to the input a of an AND gate 35 and its input D to the positive pole of the supply. The clock input C of FF 34 is connected to the output Q2 of the divider 15 which is also connected to the input of an inverter 36 the output of which is connected to the input b of gate 35. The direct output Q of FF 34 is connected to the input b of gate 32 and to the input b of the EXCLUSIVE-OR gate 16. Finally, the output of the amplifier 27 is connected to the input c of gate 35 the output of which is connected to the input a of gate 23.

At the beginning of each driving pulse the output of gate 31 passes to 1 which produces the change over of FF 33 the direct output Q of which changing to 1 while its inverted output Q changes to 0 which closes the AND gate 35. If the output of amplifier 24 passes to 1 between the second and the fourth millisecond from the beginning of the driving pulse (point A) the output of the AND gate 28 passes to 1 as well as the output of the OR gate 32 which resets FF 33. The inverted output Q of FF 33 changes over to 1 and opens the AND gate 35. When the output of the amplifier 24 changes to 0 (point B or C according to the type of amplifier utilized) the output of the inverter 27 changes to 1. The output of the amplifier 36 being also at 1 during the normal driving pulse (the output Q2 of the divider 15 is at 0), the output of gate 35 passes to 1 as well as the output of the gate 23. This resets the FF 17 and FF 19 which interrupts the driving pulse. The driving pulse is thus appreciably shortened which results in a genuine saving of energy.

Let us now examine what happens if the point A of FIG. 1 is not detected, that is if the changing from state 0 to state 1 of the output of amplifier 24 between the second and the fourth millisecond from the beginning of the driving pulse does not occurs. The FF 33 which has changed over to 1 at the beginning of the driving pulse is no more resetted. After 16 ms from the beginning of the driving pulse the output Q2 of the divider 15 changes to 1 and activate FF 34 which changes over to 1 and resets FF 33 through the gate 32. After 30 more milliseconds the output Q2 of divider 15 changes once more to 1 and FF 34 changes over to 0. The changing over of FF 34 to 1 inverts the output of the EXCLUSIVE-OR gate 16 and makes the corresponding flip-flop to change over, which means the FF 17 if the output of the gate 16 was at 0 and the FF 19 in the opposite case. The flip-flop delivers a first driving pulse for making up for the first lost step. At the moment where FF 34 changes back to 0 the output of gate 16 comes back in phase and it is the second flip-flop which delivers a second driving pulse of opposite polarity for making up for the second lost step. It is to be seen that these driving pulses for making up for the lost steps coincide with the moment where the output Q2 of the divider 15 changes to 1. The output of the inverter 36 is at 0 and the AND gate 35 is closed. The state of the output of the amplifier 24 is not taken into account and the pulses for making up have automatically a maximum duration.

The detector circuit and more particularly the amplifier 24 permits therefore either to detect the lost steps and to make up for these lost steps or to shorten the driving pulse. In the latter case the device behaves not as a servo-system, rather producing a self release of the motor, which is only possible because the amplifier 24 permits to check or survey the behaviour of the motor during all of the driving pulse. With the self release process of the motor the duration of the driving pulse adapts itself automatically at each step without any time constant. This would not be the case with a servo-system. The amplifier 24 may therefore be incorporated in other types of self release driving pulse formers for providing synchronized ultrarapid rotations of the motor or motions by two successive steps which permits the design of bidirectional stepping motors. It is also possible, by measuring the variations of the pulse duration between successive driving pulses, to detect characteristic fluctuations of the torque acting on the motor. It is also possible to determine the end of life of the battery of the device by detecting a large and steady increase of the duration of the driving pulses.

If desired, and more particularly in order to decrease the consumption of energy, it is possible to adjust the optimum duration of the driving pulses by other means without utilizing the method of self release.

Figure 7:
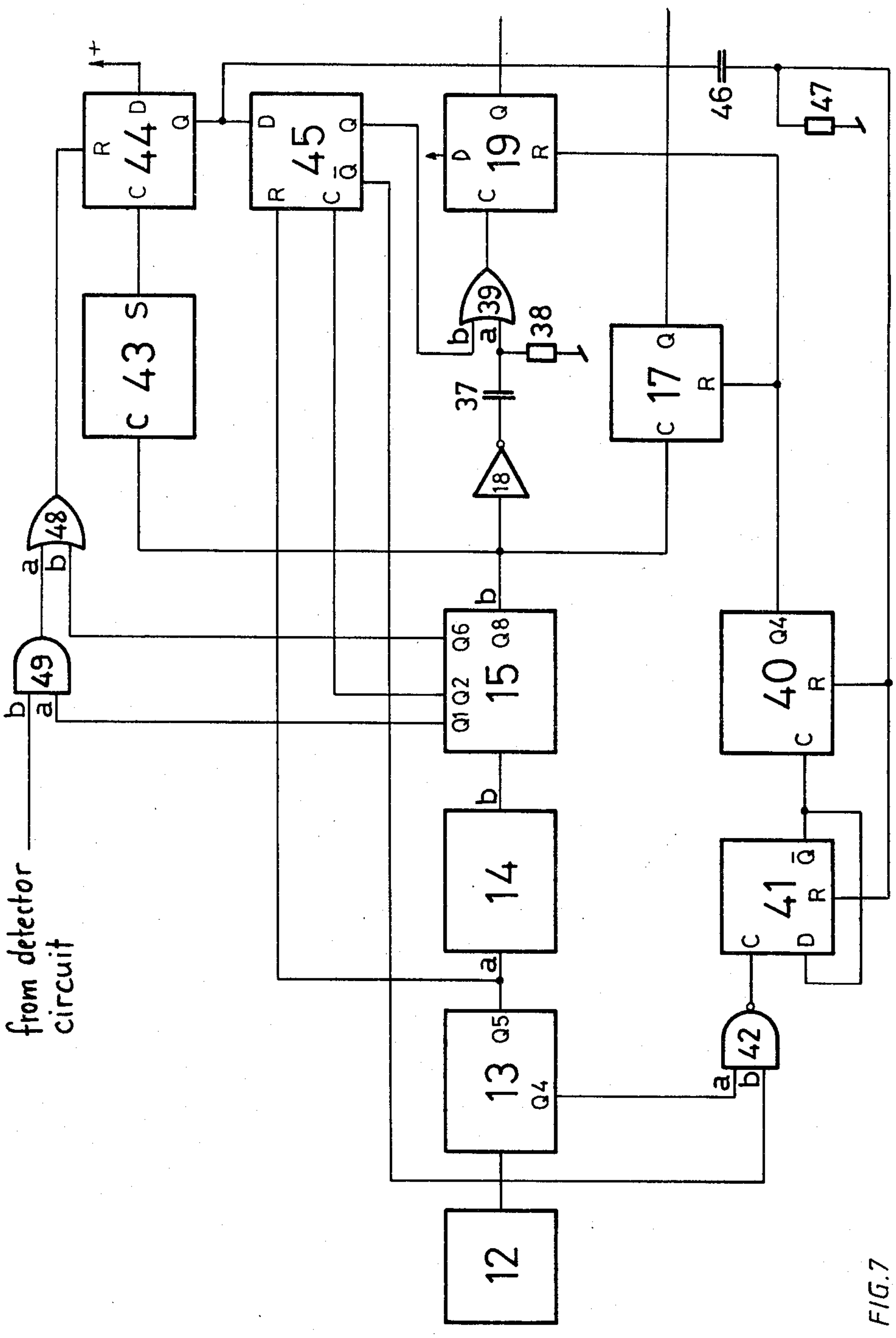
FIG. 7 shows a block diagram of a circuit for a timepiece according to the invention in which the amplifier is associated to means for controlling the duration of the driving pulses.

An example of this nature is described in relation with the circuit of FIG. 7. Like in FIG. 6, the circuit comprises the detector device of the point A of FIG. 1 including the amplifier 24, the gates 28, 30, 31 and 32, the RS flip-flop FF 29 and the flip-flop FF 33 as well as the power inverters 20 and 21 and the switch formed by the transistors 25 and 26. The above elements are not represented in FIG. 7. It is enough to recall that the output of the detector (direct output Q of FF 33) passes to 1 at the beginning of the driving pulse and normally changes back to 0 before the end of the driving pulse. In FIG. 7 are indicated the oscillator 12, the frequency divider 13, the Johnson-type counter 14 and the frequency divider 15, all of these elements being connected in cascade and the inverter 18 and the two flip-flops FF 17 and FF 19 which produce the even and odd driving pulses. The output b (0.5 Hz) of the divider 15 is connected to the clock input of FF 17 and to the input of the inverter 18 the output of which is connected through a condenser 37 to a resistor 38 and to the input a of an OR gate 39 the output of which being connected to the clock input C of FF 19. The condenser 37 and the resistor 38 are a differentiating circuit which delivers a short positive pulse when the output of the inverter 18 changes to 1, that is to say when the output b of the divider 15 passes to 0. the FF 17 and FF 19 change therefore in turn to 1 at each second. The duration of the pulses produced by these flip-flops depends on the signal on the reset inputs R of FF 17 and FF 19, that is to say on the state of the output Q4 of a counter by 8 of Johnson-type 40 to which they are connected. The clock input of the counter 40 is connected to the inverted output Q and to the D input of a D-type flip-flop FF 41. The latter is a binary stage and its clock input is connected to the output of a NAND gate 42 the input a of which is connected to the output Q4 of the divider 13 at which the signal has a frequency of 2 kHz. The FF 41 and the counter 40 form a divider by 16 with a period of 8 ms. This signal is in synchronism but not in phase with the one of the Johnson-type counter 14, that is to say with the signal at the output b of the divider 15. The duration of the pulses produced by the FF 17 and the FF 19 depends therefore on this phase shift which may vary between 0 and 7.5 ms in steps of 0.5 ms (the input frequency is 2 kHz, each shift of one period correspond to 0.5 ms and the maximum shift is 15 periods.

Let us now examine which are the means permitting to vary and to fix this phase shift in order to determine the optimum duration of the driving pulse. The output b of the divider 15 is also connected to the clock input C of an additional divider 43 comprising 7 binary stages. The output S of this divider passes to 1 every 256 seconds, that is to say about every 4 minutes.

The output S of the divider 43 is connected to the clock input of a D-type flip-flop FF 44 the input D of which is connected to the positive pole of the supply and the direct output Q of which is connected to the D input of a second D-type flip-flop FF 45 and to a condenser 46 connected to a resistor 47 and to the reset inputs R of the divider by 16 comprising the elements 41 and 40. The clock input of FF 45 is connected to the output Q2 of the divider 15 at which the signal has a frequency of 32 Hz and its reset input R is connected to the output Q5 (frequency 1 kHz) of the divider 13. The inverted output Q of FF 45 is connected to the input b of the OR gate 39 and its direct output Q to the input b of the NAND gate 42. The reset input R of FF 44 is connected to the output of an OR gate 48 the input a of which is connected to the output of an AND gate 49 and the input b to the output Q6 of the divider 15 at which the signal has a frequency of 2 Hz. Finally, the input a of the AND gate 49 is connected to the output Q1 of the divider 15 at which the signal has a frequency of 64 Hz while the input b of gate 49 is connected to the detector output of the circuit of FIG. 6. The circuit of FIG. 7 is a device permitting the search of the optimum duration of the driving pulse.

Approximately every 4 minutes the clock input C of FF 44 passes to 1, simultaneously with the output of the amplifier 18 and the clock input of FF 19, which causes the FF 44 to change over to 1. The input D of FF 45 passes to 1 and the counter 40 and the FF 41 are resetted through the condenser 46 which delivers a short positive pulse to the reset inputs R of these elements. The inverted output Q of FF 41 is at 1 and the counter 40 shall change over to 1 after 0.5 ms. The output Q4 of the counter 40 shall therefore change to 1 after 3.5 ms which stops the present driving pulse.

Hence, the first search pulse has a duration of 3.5 ms. Afterward, the FF 45 which receives a clock signal of 32 Hz and which is resetted by a signal of 1 kHz delivers at its direct output Q positive pulses having a frequency of 32 Hz and a duration of 0.5 ms.

After 0.25 second the output Q6 of the divider 15 changes to 1 and resets the FF 44 through the gate 48. At this time, the input D of FF 45 switches back to 0 and this flip-flop cannot switch back to 1. Hence, during this time interval of 0.25 second the FF 45 has delivered 8 pulses at the frequency of 32 Hz (period 31 ms). These 8 pulses are delivered through the OR gate 39 to the clock input C of FF 19 which produces as many driving pulses, all of the same polarity. The search circuit operates therefore so as to deliver every 4 minutes a train of driving pulses of the same polarity, the first of which, as already seen above, having a duration of 3.5 ms. This train of pulses may be interrupted any time by the advent of a logic state at the output of the AND gate 49. This logic state 1 resets FF 44 through the gate 48. The inverted output Q of FF 45 which passes to 0 during 0.5 ms at the time of each search pulse, is connected to the input b of the NAND gate 42. Hence, the latter is closed during 0.5 ms which eliminates one clock pulse at the clock input of FF 44 at the time of appearance of each search pulse. Each time this occurs, the output Q4 of the Johnson-type counter 40 is shifted back of 0.5 ms which results in an increase of the duration of the driving pulse. In this manner, the first driving pulse has a duration of 3.5 ms, the second of 4 ms, the third of 4.5 ms, and so on, up to 7.5 ms.

It is to be seen that the search system produces a train of driving pulses all of the same polarity, the duration of these pulses being incremented between 3.5 ms and 7.5 ms. Let us now examine what is the influence of the output signal of the detector circuit.

When the rotor receives a too short driving pulse, it rotates correctly and in the right direction during the driving pulse but its speed is too low to allow it to reach the next stable position, so that it returns to its starting position. The waveform of the current is nevertheless very close to the one of the waveform 3 of FIG. 1. Therefore, the detector circuit detects the point A and the output of the detector changes back to 0 before the output Q1 of the divider 15 passes to 1.

On the other hand, if the motor receives a driving pulse of sufficient duration, it advances of one step. The detector circuit cannot distinguish between these two situations.

If the circuit delivers to the motor a second driving pulse of the same polarity, the following situations occurs: In the first case, the rotor having not terminated its step is still in phase and it rotates further. In the second case however, the rotor having terminated its step is 180° out of phase and the current corresponds to the waveform 1 of FIG. 1. The output of the detector remains at 1 and the output of gate 49 passes to 1 after 8 ms, which resets the FF 44 through the gate 48. The search cycle is interrupted and the divider 41, 40 maintains the phase shift corresponding to the desired pulse duration.

To sum up, in the latter case, the detector permits to stop the search by detecting if the preceding driving pulse has caused the rotor to terminate its step. The search system is efficient only provided that the search starts with the minimum pulse duration and if this duration is progressively increased.

The search is interrupted and the duration of the pulse is fixed from the moment where this duration is just sufficient for causing the rotor to terminate its step. This corresponds really to the limit of the correct operation and to the condition of minimum power consumption.

It is clear that the circuit of FIG. 7 may be combined with the circuit for making up for lost steps of FIG. 6, which permits to increase the operating security of the system.

Other combinations are possible between the detector circuit comprising amplifiers according to the present description and control systems for the duration of the driving pulses. The circuits of FIGS. 6 and 7 are only illustrative examples.

I claim:

1. Timepiece comprising a frequency divider, a former of driving pulses, a stepping motor, detector means of the current of said motor and a power source, said timepiece further comprising an amplifier including at least a MOS transistor receiving on a first terminal a voltage representative of the current in the driving coil of said motor, a second terminal of said transistor being joined up to a condenser connected to one of the poles of said power source, means for charging said condenser, and means for discharging said condenser, said amplifier delivering signals representative of the current in said condenser and, means for controlling the driving pulses, said driving pulses controlling means being connected to said amplifier and to said former of driving pulses.

2. Timepiece according to claim 1, wherein said means for charging said condenser are different from said means for discharging said condenser.

3. Timepiece according to claim 1, wherein at least part of said means for charging and discharging said condenser are connected in a feedback path between an output of said amplifier and said condenser.

4. Timepiece according to claim 1, wherein said means for charging and discharging said condenser include at least one active element.

5. Timepiece according to claim 4, wherein said active elements are capable to set the charging or the discharging of said condenser out of service.

6. Timepiece according to claim 4, wherein at least one of said active elements has its control terminal connected to an output of said amplifier.

7. Timepiece according to claim 1, wherein the input of said amplifier is at least indirectly connected to one of the terminals of said driving coil.

8. Timepiece according to claim 1, wherein said amplifier is switched on periodically by pulses having the same duration than the duration of the driving pulses, said amplifier being switched out between said pulses.

9. Timepiece according to claim 1, further comprising sequential means for detecting the presence at the output of said amplifier of a signal corresponding to a determined value of the current in said driving coil.

10. Timepiece according to claim 9, wherein said detecting means are connected to a first circuit capable of controlling the driving pulse former so that said driving pulses former delivers to said motor additional driving pulses.

11. Timepiece according to claim 9, wherein said detecting means are connected to said driving pulse former for shortening the duration of said driving pulses at the time of appearance of said signal.

12. Timepiece according to claim 9, wherein said detecting means are connected to a second circuit for varying the duration of the driving pulses, said second circuit cooperating with a control circuit of said duration of the driving pulses.

13. Timepiece according to claim 1, wherein said means for controlling the driving pulses comprise an auxiliary divider synchronous with said frequency divider and means for shifting the phase of the output signal of said auxiliary divider with respect to the output signal of the frequency divider chain.

14. Timepiece according to claim 12, wherein said second circuit for varying the duration of the driving pulses and said detecting means cooperating with a control circuit of said duration of the driving pulses comprise means capable of delivering trains of driving pulses having the same polarity and a progressively increasing duration.

* * * * *